United States Patent
Burton et al.

(10) Patent No.: US 6,946,503 B2
(45) Date of Patent: Sep. 20, 2005

(54) AMINE BLEND ACCELERATORS FOR POLYOXYALKYLENEPOLYAMINE CURED EPOXY RESINS

(75) Inventors: Bruce L. Burton, Round Rock, TX (US); Chris E. Godinich, Houston, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 171 days.

(21) Appl. No.: 10/408,883

(22) Filed: Apr. 8, 2003

(65) Prior Publication Data

US 2003/0195324 A1 Oct. 16, 2003

Related U.S. Application Data

(60) Provisional application No. 60/390,668, filed on Jun. 21, 2002, provisional application No. 60/379,580, filed on May 10, 2002, and provisional application No. 60/371,965, filed on Apr. 12, 2002.

(51) Int. Cl.[7] ............... C08L 63/00; C08G 59/50; C08G 59/68

(52) U.S. Cl. ............... 523/461; 528/93; 528/94; 528/119; 528/121; 528/408

(58) Field of Search ............... 528/88, 93, 94, 528/106, 119, 120, 121, 408; 523/400, 461

(56) References Cited

U.S. PATENT DOCUMENTS

| | | | |
|---|---|---|---|
| 3,388,086 A | * 6/1968 | Doerge et al. | 527/501 |
| 4,574,143 A | 3/1986 | Sellstrom et al. | 525/438 |
| 4,578,412 A | 3/1986 | Sellstrom et al. | 524/243 |
| 4,800,222 A | 1/1989 | Waddill | 528/94 |
| 4,910,269 A | 3/1990 | Waddill | 525/532 |
| 5,489,630 A | 2/1996 | Walker | 523/404 |
| 5,688,905 A | 11/1997 | Walker | 528/332 |

* cited by examiner

Primary Examiner—Michael J. Feely
(74) Attorney, Agent, or Firm—Chris Whewell

(57) ABSTRACT

Provided herein are amine blends which may be used in place of N-aminoethyl piperazine as accelerator in the curing reaction of epoxy resins.

1 Claim, No Drawings

AMINE BLEND ACCELERATORS FOR POLYOXYALKYLENEPOLYAMINE CURED EPOXY RESINS

TECHNICAL FIELD

This invention relates to the curing of epoxy resins. More particularly, it relates to blends of amines useful as accelerators in the curing stage of epoxy resins that are cured using polyoxyalkylenepolyamines.

BACKGROUND INFORMATION

N-aminoethylpiperazine ("AEP") is widely used in conjunction with polyoxyalkylene polyamines, e.g. JEFFAMINE®D-230 amine and JEFFAMINE®T-403 amine, to serve as an accelerator for increasing the polymerization rate of epoxy resins cured with such hardeners. AEP reacts with most epoxy resins much more quickly than other amine curing agents, especially at moderate ambient temperatures (e.g. "room temperature"). Among the reasons believed for this is the presence of a tertiary amine in the AEP molecule and the relatively low amine hydrogen equivalent weight (AHEW) of the compound. Having a relatively low AHEW means that the concentration of reactive groups in a given formulation will be increased relative to a higher AHEW amine hardener or amine hardener blend.

Shortages of AEP have created a need for a substitute material that can serve to accelerate the curing reaction of slower amine curatives (e.g. JEFFAMINE® brand amines). Although other accelerators of amine cured epoxy blends exist, they each have particular drawbacks that can make them unsuitable for certain applications. For instance, phenolic accelerators are often solids and contribute undesired color or ultraviolet light sensitivity to the final formulation. Widely used liquid accelerators, e.g. nonyl phenol, mononyl phenol (MNP) etc., also serve as plasticizers, significantly and undesirably lower the glass transition temperatures (Tg) of resin systems into which they are incorporated at levels high enough to provide significant acceleration. Additionally, the accelerating effect diminishes as increasing levels of MNP are used since the reactant group concentrations are diminishing. Tertiary amines containing high levels of hydroxyl groups, such as triethanolamine, methyldiethanolamine, dimethylethanolamine, etc., have been effectively used as accelerators but since they remain as small molecules that do not react into the polymer network, they too are known to cause significant decreases in Tg.

In practice, many customers use AEP at less than about twenty weight percent to shorten the gel time of epoxy formulations that contain JEFFAMINE® brand amines as hardeners. AEP is a somewhat unusual amine in that it contains a primary, a secondary, and a tertiary amine. It has provided some of the highest exotherm temperatures seen when used to cure epoxy resins. Providing high exotherm temperatures can be advantageous to promote increased curing but can lead to polymer degradation if unchecked. If used as the sole hardener to cure diglycidylether of bisphenol A ("DGEBA")-type epoxy resins, AEP provides a Tg higher than that obtained by curing the resin with JEFFAMINE®D-230 amine. Thus, the use of AEP as an accelerator will not decrease the glass transition temperatures when used at a 1:1 stoichiometry in the formulation.

The formation of epoxy polymers from polyepoxies and polyamines is well-known in the art. These crosslinked polymer networks are formed from the reaction between a polyepoxy such as:

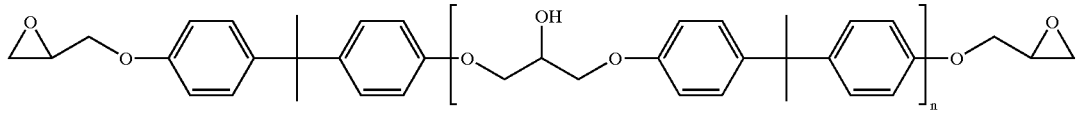

a polyamine, which may be a diamine:

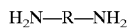

such crosslinked polymers with segments similar to:

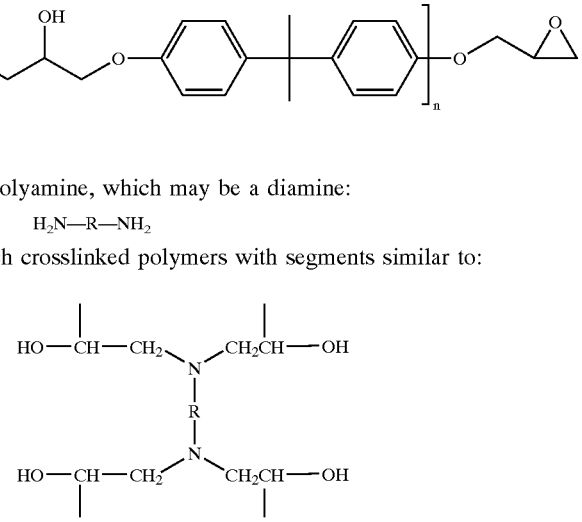

are well-known in the art, and are the reaction products of various epoxy containing compounds and various polyamines and polymers produced from the combination thereof.

SUMMARY OF THE INVENTION

One aspect of the present invention concerns blends comprising 4-(3-aminopropyl)morpholine ("APM"):

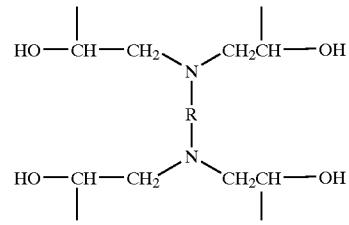

and 2-(2-aminoethylamino)ethanol ("AEEA"):

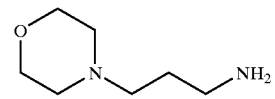

as being useful as an accelerator in the curing of epoxy resins. It is preferred in such a blend that the AEEA is present in an amount of 62.60% by weight based upon the total weight of the blend, and the APM is present in an amount of 37.40% by weight based upon the total weight of the blend. The invention also concerns a process for producing a cured epoxy polymer comprising the step of combining a polyepoxy with a polyamine, wherein the improvement comprises combining the polyepoxy and the polyamine with one another in the presence of an accelerator blend that comprises 4-(3-aminopropyl)morpholine and 2-(2-aminoethylamino)ethanol.

DETAILED DESCRIPTION

The invention is concerned with providing an accelerator material for the curing of epoxy resins that can be substituted for AEP on an equal weight basis 2-(2-aminoethylamino)ethanol ("AEEA") and 4-(3-aminopropyl)morpholine ("APM") were combined at a ratio that gave the same AHEW as AEP, namely, 43.07 g/amine hydrogen equivalent. Although the concentration of reactive amine groups is the same in an epoxy formulation, since the AHEWs are equal, the new mixture was surprisingly found to be more efficient than AEP in accelerating epoxy polymerization, as indicated by measuring the viscosity increase over time, isothermally at forty degrees C. In one instance, for the AEEA+APM blend, the time to reach a viscosity of one million centipoise at 40° C. was reduced by 10% at the same use level as AEP.

Because the AHEW of AEP (43.07 g/amine H eq.) differs from that of most other amines such as JEFFAMINE®D-230 amine (60 g/amine H eq.), a calculation must be performed to maintain stoichiometry each time a change in the AEP level is made to adjust reactivity. A method of simplifying this process has been devised wherein blends of certain reactive amine mixtures, are prepared which yield an AHEW equal to that of the main epoxy hardener, as in the following examples:

Example 1

29.90% AEP+70.10% APM (4-(3-aminopropyl)morpholine)). Since the AHEW of such a blend (60 g/amine hydrogen eq.) is equal to that of the JEFFAMINE®D-230 amine, direct substitution of the blend may be made for JEFFAMINE®D-230 amine without affecting the desired stoichiometric ratio of amine hydrogen to epoxide groups in the curable formulation. Even though the APM serves as a chain extender rather than as a crosslinker, Tg may not be significantly affected at typical use levels, since it replaces the higher molecular weight, more flexible JEFFAMINE®D-230 amine.

Example 2

A related co-hardener that can serve as an accelerator for JEFFAMINE®D-230 amine is a mixture of 73.74% JEFFAMINE®T-403 amine+26.26% AEEA (aminoethylethanolamine) which also has an AHEW of 60 g/amine hydrogen equivalent. This mixture could be used either alone as a curing agent, or as an accelerator. It could also be used in various proportions with the mixture of example 1 above in order to provide a wider range of acceleration to JEFFAMINE®D-230 amine when used to cure epoxy resins.

The concept illustrated in examples 1 and 2 above may also be extended to other amine systems for epoxy resin polymerization. If JEFFAMINE®T-403 amine (AHEW=81) were chosen as the primary hardener, careful selection of more reactive amines and their weight ratios could be used to create accelerators that could be substituted on an equal weight basis for JEFFAMINE®T-403 amine, in order to decrease the gelation and/or cure time with epoxy resins.

Example 3

36.6% "polyamide 125" (AHEW=103)+63.4% APM (aminopropylmorpholine (AHEW=72.11)). Since the AHEW of such a blend (81 g/amine H eq.) is equal to that of the JEFFAMINE®T-403 amine, direct substitution of the blend may be made for JEFFAMINE®T-403 amine without affecting the desired stoichiometric ratio of amine hydrogen to epoxide groups in the curable formulation.

Example 4

A related co-hardener that can serve as an accelerator for JEFFAMINE®T-403 amine is a mixture of 85.38% "polyamide 125" (AHEW=103)+14.62% AEEA (aminoethylethanolamine) which also has an AHEW of 81 g/amine H equivalent.

Similar strategies may be used which incorporate non-reactive, but accelerating materials to shift the AHEW of the mixture to the desired value. For instance a mixture of 42.86% AEEA +57.14% of either TEA (triethanolamine) or MNP (mononylphenol) has an AHEW of 81 and is thus useful for accelerating JEFFAMINE®T-403 amine at any substitution ratio. Of course when making such substitutions one must ascertain that other shifts in thermal or mechanical properties remain within the desired ranges for the product.

According to one form of the invention, the currently most preferred combination of amines useful as accelerators is that produced by combining 4-(3-aminopropyl)morpholine ("APM"):

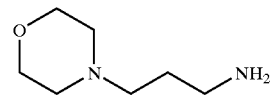

with 2-(2-aminoethylamino)ethanol ("AEEA"):

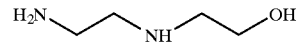

in which the AEEA is present in an amount of 62.60% by weight based upon the total weight of the blend, and in which APM is present in an amount of 37.40% by weight based upon the total weight of the blend. Such a blend has an amine hydrogen equivalent weight of 43.07, which is exactly that level necessary to render such a blend to be an equivalent substitute, on an equal weight basis, for N-aminoethylpiperazine when used as an accelerator in an epoxy system.

In one embodiment of the invention, there is provided a process for producing a cured epoxy polymer comprising the step of combining a polyepoxy with a polyamine, wherein the improvement comprises combining the polyepoxy and the polyamine with one another in the presence of an accelerator blend that comprises 4-(3-aminopropyl)morpholine and 2-(2-aminoethylamino)ethanol, in which the polyamine comprises a polyoxyalkylene polyalkylpolyamine capable of forming a cured epoxy by its reaction with a polyepoxy, wherein the polyoxyalkylene polyalkylpolyamine is of the formula:

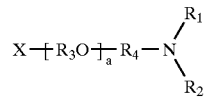

in which $R_1$ and $R_2$ are each independently selected from the group consisting of: hydrogen; an alkyl group having 1, 2, 3, 4, 5, or 6 carbon atoms, whether straight-chain or branched; or a radical of the formula:

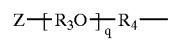

in which $R_3$ in each occurrence may be an alkyl group having any number of carbon atoms selected from 1, 2, 3, 4, 5, or 6, straight-chain or branched; $R_4$ in each occurrence is a straight-chain or branched alkyl bridging group having 1, 2, 3, 4, 5, or 6 carbon atoms; Z is a hydroxy group or alkyl group containing 1, 2, 3, 4, 5, or 6 carbon atoms, straight-chain or branched; q is any integer between 0 and 400; and wherein X is any of:
 i) a hydroxy group or an alkyl group having any number of carbon atoms selected from 1, 2, 3, 4, 5, or 6; or
 ii) a group

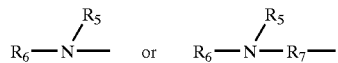

in which $R_5$ and $R_6$ are each independently selected from the group consisting of: hydrogen; an alkyl group having 1, 2, 3, 4, 5, or 6 carbon atoms, whether straight-chain or branched; or

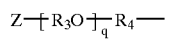

as defined above in which Z is a hydroxy group or an alkoxy group having 1, 2, 3, 4, 5, or 6 carbon atoms, and in which $R_7$ is a straight-chain or branched alkylene bridging group having 1, 2, 3, 4, 5, or 6 carbon atoms; or
 iii) a moiety of the formula:

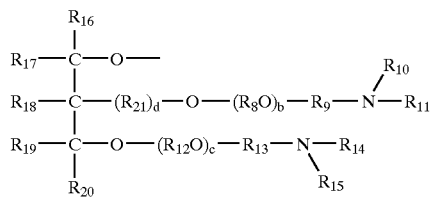

in which $R_{10}$, $R_{11}$, $R_{14}$, and $R_{15}$ are each independently selected from the group of hydrogen; an alkyl group having 1, 2, 3, 4, 5, or 6 carbon atoms, straight-chain or branched; the moiety

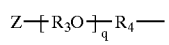

as defined above in which Z is a hydroxy or alkoxy group having 1, 2, 3, 4, 5, or 6 carbon atoms; $R_8$ and $R_{12}$ are each independently alkyl groups having 1, 2, 3, 4, 5, or 6 carbon atoms, straight-chain or branched; $R_9$, $R_{13}$, and $R_{21}$ are each independently selected from a straight-chain or branched alkyl bridging linkage having 1, 2, 3, 4, 5, or 6 carbon atoms; $R_{16}$, $R_{17}$, $R_{18}$, $R_{19}$, $R_{20}$ are each independently selected from hydrogen or an alkyl group having 1, 2, 3, 4, 5, or 6 carbon atoms; d is 0 or 1; a is any integer between 0 and 100, with the proviso that when X is a moiety of the formula given in iii) above, b and c may each independently be any integer in the range of 0 to 390, and the sum of a+b+c is any number between 2 and 400.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

We claim:

1. In a process for producing a cured epoxy polymer comprising the step of combining a polyepoxy with a polyamine, wherein the improvement comprises combining the polyepoxy and the polyamine with one another in the presence of an accelerator blend that comprises 4-(3-aminopropyl)morpholine and 2-(2-aminoethylamino) ethanol, and wherein said polyamine comprises a polyoxyalkylene polyalkylpolyamine of the formula:

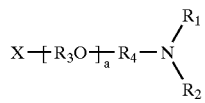

in which $R_1$ and $R_2$ are each independently selected from the group consisting of: hydrogen; an alkyl group having 1, 2, 3, 4, 5, or 6 carbon atoms, whether straight-chain or branched; and a radical of the formula:

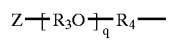

in which $R_3$ in each occurrence may be an alkyl group having any number of carbon atoms selected from 1, 2, 3, 4, 5, or 6, straight-chain or branched; $R_4$ in each occurrence is a straight-chain or branched alkyl bridging group having 1, 2, 3, 4, 5, or 6 carbon atoms; Z is a hydroxy group or alkyl group containing 1, 2, 3, 4, 5, or 6 carbon atoms, straight-chain or branched; q is any integer between 0 and 400; and wherein X is any of:
 i) a hydroxy group or an alkyl group having any number of carbon atoms selected from 1, 2, 3, 4, 5, or 6; or
 ii) a group

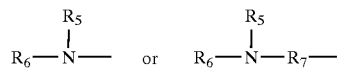

in which $R_5$ and $R_6$ are each independently selected from the group consisting of: hydrogen; an alkyl group having 1, 2, 3, 4, 5, or 6 carbon atoms, whether straight-chain or branched; or

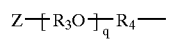

as defined above in which Z is a hydroxy group or an alkoxy group having 1, 2, 3, 4, 5, or 6 carbon atoms, and in which $R_7$ is a straight-chain or branched alkylene bridging group having 1, 2, 3, 4, 5, or 6 carbon atoms; or
 iii) a moiety of the formula:

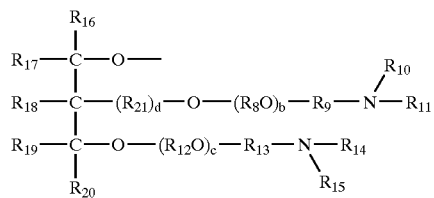

in which $R_{10}$, $R_{11}$, $R_{14}$, and $R_{15}$ are each independently selected from the group of: hydrogen; an alkyl group having 1, 2, 3, 4, 5 or 6 carbon atoms, straight-chain or branched; the moiety

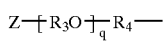

as defined above in which Z is a hydroxy or alkoxy group having 1, 2, 3, 4, 5, or 6 carbon atoms; $R_8$ and $R_{12}$ are each independently alkyl groups having 1, 2, 3, 4, 5, or 6 carbon atoms, straight-chain or branched; $R_9$, $R_{13}$, and $R_{21}$ are each independently selected from a straight-chain or branched alkyl bridging linkage having 1, 2, 3, 4, 5, or 6 carbon atoms; $R_{16}$, $R_{17}$, $R_{18}$, $R_{19}$, and $R_{20}$ are each independently selected from hydrogen or an alkyl group having 1, 2, 3, 4, 5, or 6 carbon atoms; d is 0 or 1; a is an integer between 0 and 100, with the proviso that when X is a moiety of the formula given in iii) above, b and c may each independently be any integer in the range of 0 to 390, and the sum of a+b+c is any number between 2 and 400.

* * * * *